United States Patent [19]

Sakurai

[11] Patent Number: 4,925,209
[45] Date of Patent: May 15, 1990

[54] ASSEMBLY FOR MOUNTING AIR BAG COVER

[75] Inventor: Hideyuki Sakurai, Toyota, Japan

[73] Assignee: Toyota Jidosha Kabushiki Kaisha, Japan

[21] Appl. No.: 316,801

[22] Filed: Feb. 28, 1989

[30] Foreign Application Priority Data

Mar. 11, 1988 [JP] Japan ............................ 63-32364[U]

[51] Int. Cl.⁵ .............................................. B60R 21/16
[52] U.S. Cl. .................... 280/743; 280/728; 280/732
[58] Field of Search ............... 280/739, 743, 728, 729, 280/730, 732, 742

[56] References Cited

U.S. PATENT DOCUMENTS

| 3,708,179 | 1/1973 | Hulten | 280/150 |
| 4,262,931 | 4/1981 | Strasser et al. | 280/743 |
| 4,286,954 | 9/1981 | McArthur | 280/743 |
| 4,327,937 | 5/1982 | Scholz et al. | 280/732 |
| 4,793,631 | 12/1988 | Takada | 280/743 |

FOREIGN PATENT DOCUMENTS 50-147337 5/1975 Japan.
58-110338 6/1983 Japan.

Primary Examiner—Richard A. Bertsch
Attorney, Agent, or Firm—Kenyon & Kenyon

[57] ABSTRACT

An assembly for mounting an air bag cover in which an insert is formed integrally with the air bag cover so as to extended from the same, the end of the extend portion is bent back on itself to form a folded outer edge, and bolt holes are formed in the extended portion. The cover is mounted on the body of the vehicle by inserting bolts in the bolt holes. This assembly also includes a reinforcement member inserted into the bent portion at a position closer than the bolt holes to the extreme end folded outer edge of the extended portion. Even if the insert cracks at the bolt holes when the air bag cover is opened, the reinforcement member stops the progress of breaking of the insert by contacting the bolts, thereby preventing the cover from coming off and flying.

14 Claims, 4 Drawing Sheets

ASSEMBLY FOR MOUNTING AIR BAG COVER

BACKGROUND OF THE INVENTION

This invention relates to an assembly for mounting an air bag cover which is disposed to cover an opening formed in an instrument panel of a vehicle in front of the assistant driver's seat and which is opened by an air bag when the air bag is expanded.

A type of air bag apparatus housed inside an instrument panel of a motor vehicle in front of the assistant driver's seat is known. This apparatus operates to protect the occupant seating on the assistant driver's seat from impacts resulting from abrupt deceleration during an emergency state of the vehicle.

In the structure of this air bag apparatus housed inside the instrument panel in front of the assistant driver's seat, an opening through which the air bag can pass when expanded is formed in the instrument panel, and this opening is closed with an air bag cover.

The air bag apparatus operates in such a manner that as the air bag expands when an emergency state of the vehicle takes place, the air bag cover is swung by the pressure of expansion of the air bag to be opened toward the occupant. (U.S. Pat. No. 4,327,937 and Japanese Utility Model Application Laid-Open No. 50-147337 disclose examples of this type of apparatus.)

In this conventional art, the air bag cover is mounted in such a manner that an attachment member embedded in the air bag cover at one end thereof is fixed to the body of the vehicle by bolts.

The attachment member is formed of a thin plate-like member in order that the air bag cover can be easily opened by the expansion pressure of the air bag, and bolt holes in which bolts are inserted are formed in the attachment member. There is therefore a possibility of the attachment member of the air bag cover breaking at the bolt holes, flying in pieces and breaking the expanding air bag when the air bag cover is opened.

SUMMARY OF THE INVENTION

In view of the foregoing, an object of the present invention is to provide an air bag cover mount assembly of a simple construction capable of maintaining the connection of the air bag cover to the body of the vehicle with improved reliability when the air bag cover is opened by expansion of the air bag.

To this end, the present invention provides an assembly for mounting an air bag cover disposed to cover an opening formed in the instrument panel in front of an occupant's seat of a vehicle, the cover is opened by an air bag when the air bag is expanded The assembly includes: a plate-like member formed integrally with the cover so as to extend from the same, the plate-like member having at least one bolt hole in which a bolt is inserted to mount the cover on the body of the vehicle; and a reinforcement member fixed to the plate-like member at a position closer to the extreme end of the extended portion relative to the position of the bolt hole.

Specifically, the arrangement may be such that a doubled portion is formed by bending the extended portion, at least one bolt hole is formed in the doubled portion, and the cover is mounted by inserting a bolt in the bolt hole. Also, the reinforcement member may be inserted into the bent portion of the extended portion at a position closer to the extreme end of the extended portion relative to the position of the bolt hole.

In the structure in accordance with the present invention, the reinforcement member is provided at the end of the air bag cover where the air bag cover is supported when opened. Even if the plate-like member is broken when the air bag cover is opened by the pressure of expansion of the air bag, the air bag cover can be positively retained on the vehicle body while being opened because the reinforcement member contacts the bolt.

Thus, in the air bag cover mount assembly in accordance with the present invention, the reinforcement member is disposed at the extreme end of the plate-like member in such a manner that it contacts the bolt so as to prevent the cover from coming off and flying even if the plate-like member is broken at the bolt hole during expansion of the air bag.

DESCRIPTION OF THE PREFERRED EMBODIMENT

Figure 1:
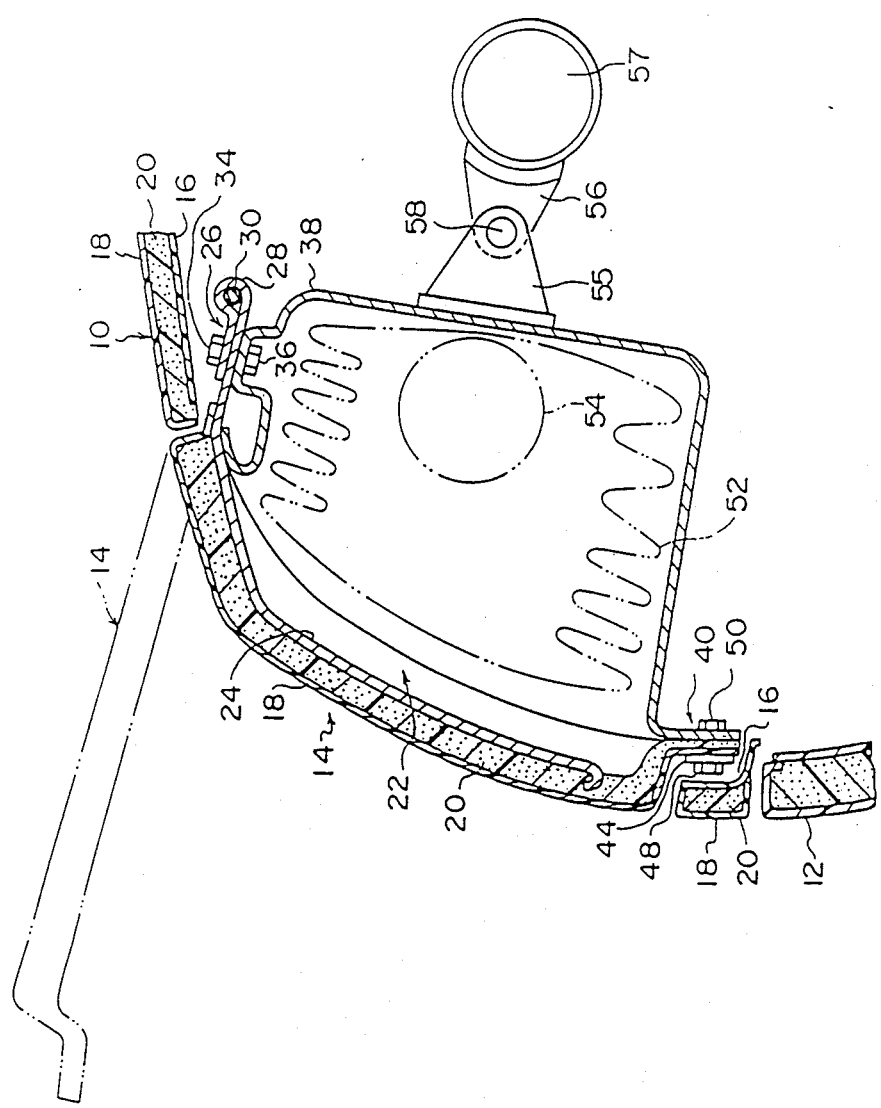
FIG. 1 is a vertical cross-sectional view of an instrument panel illustrating the structure of an air bag cover mount assembly which represents an embodiment of the present invention.
Figure 2A:
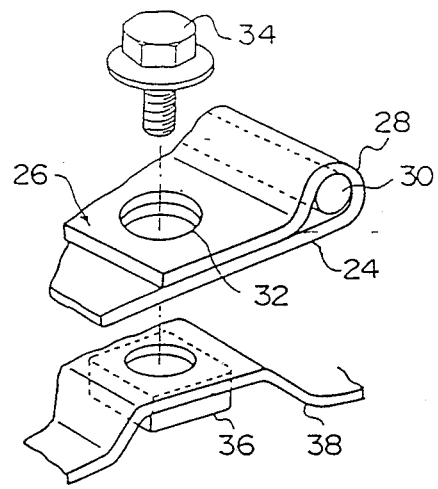
FIG. 2(A) is a fragmentary enlarged perspective view of bent and doubled portions of an insert.
Figure 2B:
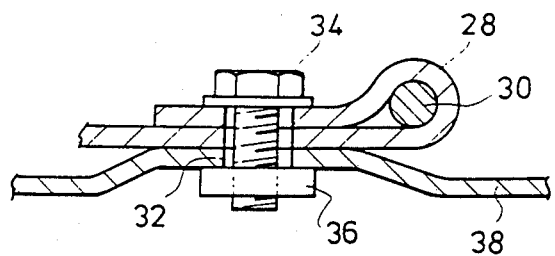
FIG. 2(B) is a cross-sectional view of bent and doubled portions of the insert.
Figure 2C:
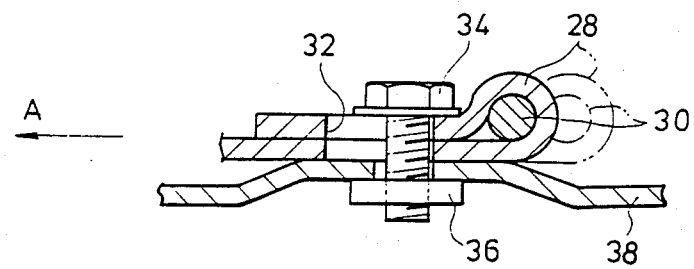
FIG. 2(C) is a cross-sectional view showing a moving condition of the insert due to intrusion of a bolt into the insert caused by expansion of the air bag and jerk of the air bag cover in a direction of an arrowhead A.
Figure 3:
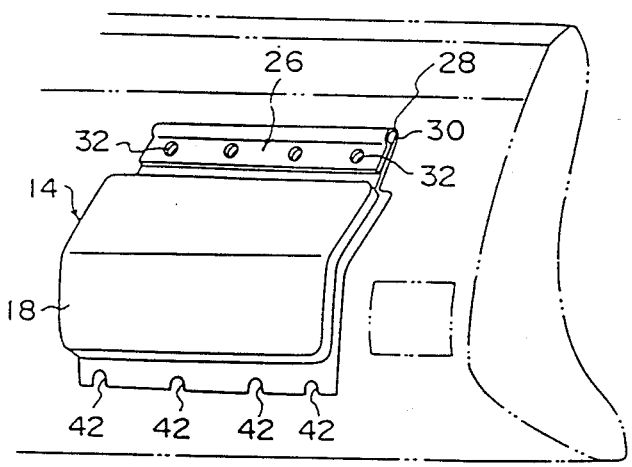
FIG. 3 is a perspective view of the whole of the air bag cover.

FIGS. 1 to 3 show the structure of an assembly for mounting an air bag cover which represents an embodiment of the present invention.

As shown in FIG. 1, an air bag cover 14 is mounted above a glove door 12 in a portion of the instrument panel 10 located in front of the assistant driver's seat.

The instrument panel 10 is formed by expanding polyurethane resin 20 between a surface member 18 formed from a semirigid polyvinyl chloride and the surface of an instrument panel insert 16 formed from FRAS (fiber reinforced acrylonitrile-styrene) or the like so that these three members or materials are integrally bonded together. The polyurethane resin 20 is of a soft type and serves as a safety pad formed in the instrument panel 10.

The air bag cover 14 is disposed to cover an opening 22 formed in the instrument panel 10. The polyurethane resin 20 is also expanded between the surface of a cover insert 24 formed of an aluminum member and a surface member corresponding to the surface member 18 and also indicated by the reference character 18 so that these three elements are integrally bonded together. The urethane resin forms a safety pad in the air bag cover 14. The cover insert is made of aluminum in order to decrease the weight of the air bag cover 14 and all on the cover 14 open quickly.

As illustrated in FIG. 1, the upper end of the cover insert 24 extends inside the instrument panel 10 and is folded back so as to be doubled on the upper side of the cover insert 24, thereby forming a doubled portion 26 which is rectangular as viewed in plan together with a bent portion 28 having a generally circular cross section.

A core member 30 in the form of a round rod formed from iron is inserted into the space formed the bent portion 28.

As shown in FIGS. 2(A), 2(B) and 3, the doubled portion 26 has a plurality of bolt holes 32 which are arranged in the widthwise direction of the vehicle. The air bag cover 14 is attached to an air bag case 38 by bolts 34 inserted in the bolt holes 32 and by nuts 36.

As shown in FIG. 1, a bracket 55 is fixed on the surface of the air bag case 38 facing in the direction of the front end of the vehicle. The bracket 55 is fixed, by a bolt 58, to another bracket 56 supported on a vehicle body component member 57 (e.g., a member for reinforcing the instrument panel) which faces the air bag case 38.

The air bag cover 14 has a lower end portion 40 constituted by the surface member 18 and the urethane resin 20. A plurality of U-shaped cutouts 42 are formed in the lower end portion 40 so as to be arranged in the widthwise direction of the vehicle, as shown in FIG. 3.

As shown in FIG. 1, a resilient member 44 in the form of a plate is disposed on the lower end portion 40, and the lower end portion 40 is connected to the lower end of the air bag case 38 by elastically compressing the resilient member 44 between the heads of bolts 48 and nuts 50.

The outer surface of the air bag cover 14 attached to cover the opening 22 of the instrument panel 10 is flush with the outer surface of the instrument panel 10. Thus, the overall appearance of the instrument panel 10 is made smooth and the body of the air bag apparatus is hidden and protected.

A folded air bag 52 (indicated by the double-dot-dash line) is accommodated in the air bag case 38 facing the inner surface of the air bag cover 14, a cylindrical inflator 54 is provided inside the air bag 52.

The air bag cover 14 and the air bag case 38 in which the folded air bag 52 and the inflator 54 are accommodated are assembled on the instrument panel 10 before the instrument panel 10 is fitted in the vehicle. This assembly is performed in such a manner that the air bag cover 14 to which the bolts 34 have been fitted is placed at a predetermined position, the air bag case 38 is then disposed at a predetermined position, and the air bag cover 14 and the air bag case 38 are fixed to each other by being fastened with bolts 34 and the nuts 36.

The material of the core member 30 is not limited to iron. It is of course possible to form the core member 30 from copper, aluminum or the like instead of iron.

The bent portion 28 may be formed in a simpler manner such that the upper end of the cover insert 24 is more turned up while the core member 30 is maintained on the upper end of the cover insert 24, thereby making it easier to fit core member 30 and the bent portion 28 to each other.

The operation of this embodiment of the present invention will be described below.

Referring back to FIG. 1, the air bag cover 14 is ordinarily in a stationary state while being maintained in the original assembled state. In this state, the doubled portion 26 of the air bag cover 24 is firmly fixed to the air bag case 38 by the bolt 34 while the lower end 40 is firmly fixed to the lower flange portion of the air bag case 38 by the bolts 48 and the nuts 50.

Thus, the air bag cover 14 is fixedly secured to the air bag case 38 and therefore there is no possibility of occurrence of any annoying vibrations or rattles. Also there is no possibility of the air bag cover 14 being shifted or coming off and resulting in an undesirable state in terms of appearance.

Figure 4:
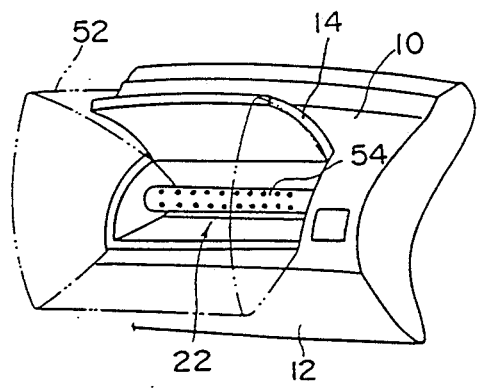
FIG. 4 is a perspective view of an opened state of the air bag cover when the air bag is expanded.

If a sensor (not shown) provided in the vehicle senses abrupt deceleration of the vehicle, the inflator 54 generates a gas so as to expand the air bag 52 in an instant, and the air bag 52 presses the air bag cover 14 during expansion. As the air bag cover 14 is pressed by the air bag 52, the lower end 40 of the air bag cover 14 is disengaged from the bolts 48 at its U-shaped cutouts 42. The lower end 40 of the air bag cover 14 is thereby easily moved away from the air bag case 38 and the air bag cover 14 opens by swinging upward about the bolts 34 inserted in the doubled portion 26 so as to open, as shown in FIG. 4. (The opened state is also indicated by the double-dot-dashed line in FIG. 1.) During the movement of the air bag cover 14 before the fully opened state, there is substantially no possibility of occurrence of cracks or the like in the doubled portion 26 and, hence, no possibility of the air bag cover 14 coming off and flying by the force of expansion of the air bag 52, since the doubled portion 26 of the air bag cover 14 is formed of two superposed portions of the cover insert 24 made of aluminum and therefore has an improved rigidity.

This construction of the doubled portion 26 is also advantageous in terms of production cost because it eliminates the need for the provision of other separate reinforcement members.

It is possible to prevent the attachment portion of the air bag cover from being broken even if cracks or the like are formed in the doubled portion 26, because the core member 30 inserted in the bent portion 28 is in engagement with the bolts 34 (FIG. 2 (C)).

Figure 5:
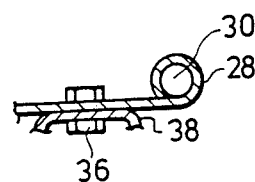
FIG. 5 is a fragmentary diagram of another example of the attached state of the insert.

The present invention has been described above with respect to the case where the bolt holes are formed in the doubled portion 26 to enable the air bag cover to be attached. Instead, the arrangement may be such that, as shown in FIG. 5, the core member 30 is fixed to the bent portion 28 of the cover insert by, for example, welding and bolt holes are formed in the vicinity of the same. In this case also, there is a possibility of the insert 24 being broken by the bolts 34 when the air bag cover is opened, but the progress of breakage stops when the core member 30 and the bolts 34 are brought into contact with each other, thus, preventing the cover from coming off and flying.

What is claimed is:

1. An assembly for mounting an air bag cover disposed to cover an opening formed in a panel in front of an occupant's seat of a vehicle, said cover being opened by an air bag when the air bag is expanded, said assembly comprising:
   a plate-like member formed integrally with said cover and having a portion that extends from the cover to an outer edge of said plate-like member, said plate-like member having at least one bolt hole formed in its extended portion;
   a reinforcement member fixed to said plate-like member at a location closer than said bolt hole to the outer edge of the extended portion; and
   a bolt inserted in said bolt hole for connecting the cover to the vehicle body.

2. An assembly for mounting an air bag cover according to claim 1, wherein said cover has at least one cut-out portion formed in an edge opposite to said extended potion of said plate-like member, and the corresponding portion of said cover adjacent to the edge opposite to said extended portion of said plate-like member is connected to the vehicle body by a bolt inserted in said cut-out portion.

3. An assembly for mounting an air bag cover according to claim 2, wherein said at least one cut-out portion formed in said edge of said cover includes a plurality of cut-out portions arranged in a row extending in the widthwise direction of the vehicle when said cover is mounted.

4. An assembly for mounting an air bag cover according to claim 2, wherein said at least one cut-out portion formed in said edge of said cover has a U-shaped configuration.

5. An assembly for mounting an air bag cover according to claim 2, wherein said at least one cut-out portion formed in said edge of said cover has a U-shaped configuration.

6. An assembly for mounting an air bag cover according to claim 1, wherein said plate-like member is formed from aluminum.

7. An assembly for mounting an air bag cover according to claim 1, wherein said at least one bolt hole includes a plurality of bolt holes arranged in a row extending in the widthwise direction of the vehicle when said cover is mounted, and said reinforcement member is fixed to said plate-like member so as to extend in the widthwise direction of the vehicle when said cover is mounted.

8. An assembly for mounting an air bag cover according to claim 1, wherein said reinforcement member is fixed to said plate-like member by being inserted into a bent portion formed by folding said extended portion of said plate-like member.

9. An assembly for mounting an air bag cover disposed to cover an opening formed in a panel in front of an occupant's seat of a vehicle, said cover being opened by an air bag when the air bag is expanded, said assembly comprising:

a plate-like member formed integrally with said cover and having a portion that extends from the cover, said plate-like member having a doubled portion formed in its extended portion by bending the end of said extended portion and superposing the bent end on an intermediate portion of said extended portion, at least one bolt hole being formed in said doubled portion of said plate-like member;

a reinforcement member fixed to said plate-like member at a location closer than said bolt hole to the bend of said extended portion; and said cover being connected to said vehicle body by a bolt inserted in said cut-out portion.

10. An assembly for mounting an air bag cover according to claim 9, wherein said cover has at least one cut-out portion formed in an edge opposite to said extended portion of said plate-like member, and the corresponding portion of said cover adjacent to the edge opposite to said extended portion of said plate-like member is connected to the vehicle body by a bolt inserted in said cut-out portion.

11. An assembly for mounting an air bag cover according to claim 10, wherein said at least one cut-out portion formed in said edge of said cover includes a plurality of cut-out portions arranged in a row extending in the widthwise direction of the vehicle when said cover is mounted.

12. An assembly for mounting an air bag cover according to claim 9, wherein said plate-like member is formed from aluminum.

13. An assembly for mounting an air bag cover according to claim 9, wherein said at least one bolt hole includes a plurality of bolt holes arranged in a row extending in the widthwise direction of the vehicle when said cover is mounted, and said reinforcement member is fixed to said plate-like member so as to extend in the widthwise direction of the vehicle when said cover is mounted.

14. An assembly for mounting an air bag cover according to claim 9, wherein said reinforcement member is placed on the extended portion of said plate-like member, and said extended portion is thereafter folded along said reinforcement member to form a folded portion in which said reinforcement member is retained.

* * * * *

UNITED STATES PATENT AND TRADEMARK OFFICE
CERTIFICATE OF CORRECTION

PATENT NO. : 4,925,209
DATED : May 15, 1990
INVENTOR(S) : Hideyuki Sakurai

It is certified that error appears in the above-identified patent and that said Letters Patent is hereby corrected as shown below:

ABSTRACT, line 3, change "extend portion" to --extended portion--.

ABSTRACT, line 9, delete "extreme end".

Column 2, line 67, change "all on" to --allow--.

Column 2, line 68, between "14" and "open" insert --to--.

Column 5, line 4, change "potion" to --portion--.

Signed and Sealed this

Fifteenth Day of December, 1992

Attest:

DOUGLAS B. COMER

*Attesting Officer*   Acting Commissioner of Patents and Trademarks